US007035954B1

(12) United States Patent
Duran

(10) Patent No.: US 7,035,954 B1
(45) Date of Patent: Apr. 25, 2006

(54) AUTOMATIC BUS SPEED AND MODE BALANCING AFTER HOT-PLUG EVENTS ON HOT-PLUG DRIVER

(75) Inventor: Francisco L. Duran, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 278 days.

(21) Appl. No.: 10/407,092

(22) Filed: Apr. 3, 2003

(51) Int. Cl.
*H05K 7/10* (2006.01)
*G06F 13/00* (2006.01)

(52) U.S. Cl. .................................... 710/302; 710/301

(58) Field of Classification Search ................ 710/301, 710/302
See application file for complete search history.

(56) References Cited

U.S. PATENT DOCUMENTS

| | | | | |
|---|---|---|---|---|
| 6,070,207 | A * | 5/2000 | Bell | 710/302 |
| 6,134,621 | A * | 10/2000 | Kelley et al. | 710/311 |
| 6,182,173 | B1 * | 1/2001 | Grosser et al. | 710/302 |
| 6,185,692 | B1 * | 2/2001 | Wolford | 713/501 |
| 6,263,387 | B1 * | 7/2001 | Chrabaszcz | 710/302 |
| 6,286,066 | B1 * | 9/2001 | Hayes et al. | 710/302 |
| 6,529,987 | B1 * | 3/2003 | Reid | 710/302 |
| 6,772,263 | B1 * | 8/2004 | Arramreddy | 710/302 |
| 6,782,438 | B1 * | 8/2004 | Duncan et al. | 710/104 |
| 6,799,238 | B1 * | 9/2004 | Miller | 710/302 |
| 6,820,156 | B1 * | 11/2004 | Miller et al. | 710/301 |
| 6,859,882 | B1 * | 2/2005 | Fung | 713/300 |
| 2002/0099875 | A1 * | 7/2002 | Locklear et al. | 710/2 |
| 2004/0123009 | A1 * | 6/2004 | Holley et al. | 710/302 |

OTHER PUBLICATIONS

PCI Local Bus, "PCI Hot-Plug Specification", PCI Special Interest Group, Rev. 1.1, Jun. 20, 2001, pp. 1-40.
PCI Local Bus, "PCI Standard Hot-Plug Controller and Subsystem Specification", PCI Special Interest Group, Rev. 1.0, Jun. 20, 2001, pp. 1-196.

* cited by examiner

*Primary Examiner*—Rehana Perveen
*Assistant Examiner*—Christopher Daley
(74) *Attorney, Agent, or Firm*—Zagorin O'Brien Graham LLP

(57) ABSTRACT

A technique for rebalancing performance levels of one or more add-in cards is presented. Rebalancing occurs whenever a hot-plug event occurs and a change in status of a mismatch condition occurs. For example, if an add-in card is inserted that is unable to operate at the current performance level, rebalancing of the performance level occurs. Thus, for an insertion event, the performance level of all cards may be lowered. Alternatively, if an add-in card is removed and a mismatch is resolved, rebalancing of the performance level occurs. Thus, for a removal event, the performance level may be increased. The rebalancing includes disabling any enabled cards and enabling all cards at a different performance level. In one embodiment, the cards are sorted according to highest performance level available and enabled in an order of lowest to highest of the highest performance level available.

45 Claims, 8 Drawing Sheets

AUTOMATIC BUS SPEED AND MODE BALANCING AFTER HOT-PLUG EVENTS ON HOT-PLUG DRIVER

BACKGROUND

1. Field of the Invention

The present application relates to handling of hot-plug events in computer systems and more particularly to handling change in mismatch status when an add-in card is inserted or removed.

2. Description of the Related Art

Computing systems are information handling systems which are designed to give independent computing power to one or more users. Computing systems can be found in many forms including, for example, mainframes, minicomputers, workstations, servers, personal computers, internet terminals, notebooks and embedded systems. Personal computer (PC) systems include desk top, floor standing, or portable versions. A typical PC system is a microcomputer that includes a microprocessor, associated memory and control logic (typically on a system board) and a number of peripheral devices that provide input and/or output (I/O) for the system. PC system boards often receive expansion printed circuit boards (PCBs) to increase the capabilities of the computer system and to connect to peripheral devices through an expansion bus.

Generally, computer systems include multiple extension slots on a communication bus to provide access to external peripheral devices using add-in cards. The architecture and functioning of the communication bus and interfaces can be standardized throughout the computer industry to allow multiple equipment vendors to provide external peripheral devices for the computer systems. One such standard is *PCI Hot-Plug Specification, Rev.* 1.0 *and* 1.1 defined by PCI Special Interest Group and incorporated herein by reference in its entirety. Add-in cards expand the functionality of the computer system and can be, for example, a network interface card, a game card, and the like.

PCI Hot-Plug specification defines some of the key aspects of a process of inserting and removing add-in cards in the extension slots of a PCI bus in a computer system while the computer system is running. PCI Hot-Plug specification allows a hardware platform such as a computer system to accept a hot-plug event such as an insertion or removal of an add-in card without rebooting the computer system. Typically, the hot-plug events are controlled by a hot-plug controller in the computer system. A hot-plug event driver in the computer system processes the hot-plug events for the hot-plug controller. PCI Special Interest Group has also defined a standard for hot-plug controllers in *PCI Standard Hot-Plug Controller and Subsystem Specification Rev.* 1.0 ("controller specification") incorporated herein by reference in its entirety.

The controller specification defines the general interface of hot-plug events with the hardware platform. However, the controller specification does not specify the handling of add-in cards having different performance levels in the extension slots. According to the controller specification, when an add-in card with a performance mismatch is inserted, that is, the add-in card is not capable of running at the current bus interface performance level, the card is simply not enabled. Additionally, when a card is removed, the remaining cards are not affected. This method assures no interruption in currently enabled cards, however, lower levels of performance and the inability to use an add-in card can occur.

SUMMARY

Accordingly, a technique for rebalancing performance levels of one or more add-in cards is presented. Rebalancing occurs whenever a hot-plug event occurs and a change in status of a mismatch condition occurs. For example, if an add-in card is inserted that is unable to operate at the current performance level, rebalancing of the performance level occurs. Thus, for an insertion event, the performance level of all cards may be lowered. Alternatively, if an add-in card is removed and a mismatch is resolved, rebalancing of the performance level occurs. Thus, for a removal event, the performance level may be increased.

Accordingly, in one embodiment, rebalancing a performance level of one or more cards upon a hot-plug event and a change is status of a mismatch condition is performed. The rebalancing includes disabling any enabled cards and enabling all cards at a different performance level.

In another embodiment, the disabling of the cards includes requesting removal of a card and receiving one of two responses: approve removal request or a request timeout. After the approve removal request or the request timeout is received, the card is disabled. This is repeated until all cards are disabled.

In another embodiment, the cards are sorted according to highest performance level available and enabled in an order of lowest to highest of the highest performance level available.

In another embodiment, another rebalancing occurs if a card with the lowest highest performance level cannot be enabled.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
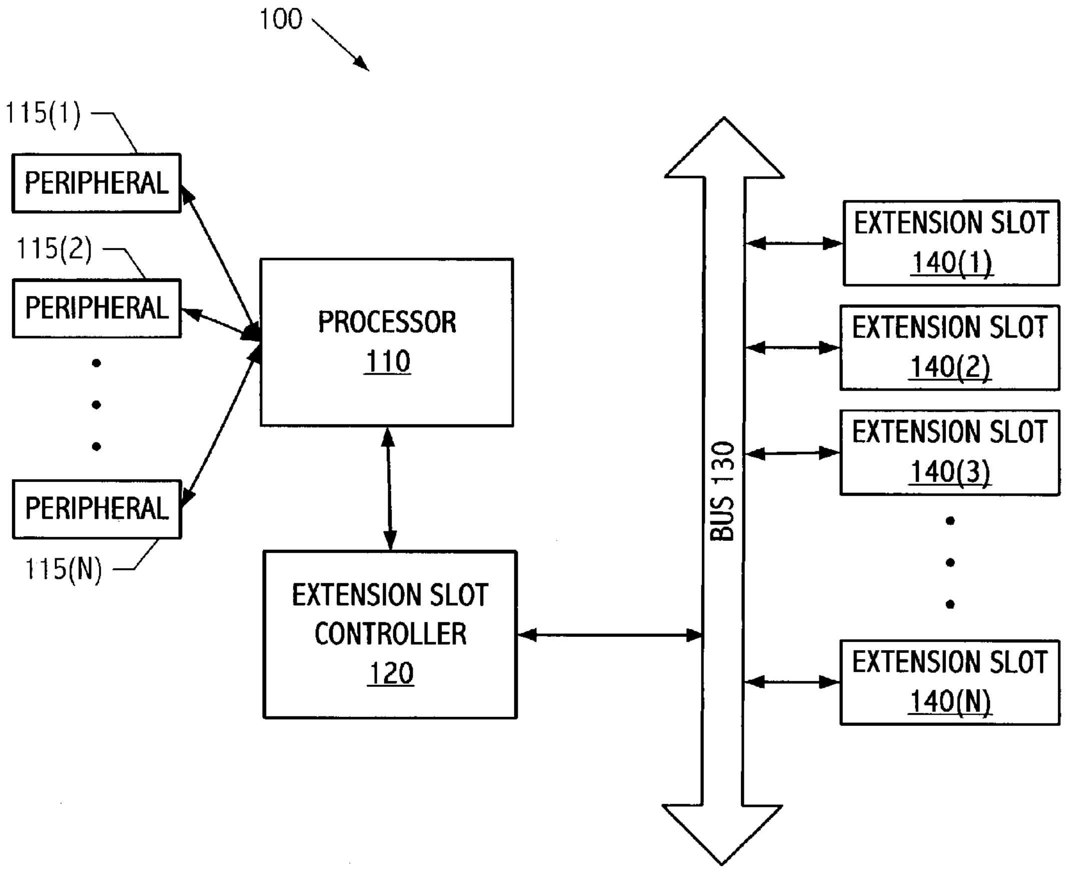
FIGS. 1A–1B illustrate a typical architecture and a software module interaction of a computer system according to an embodiment of the present invention.

FIG. 1A illustrates a typical architecture of a computer system according to an embodiment of the present invention. Computer system 100 includes a processor 110. Processor 110 can be any type of processing unit, for example, a general purpose microprocessor, a microcontroller, a super-scalar processor, a VLIW processor or the like. For purposes of illustration, one processor is shown here. However, one skilled in the art will appreciate that computer system 100 can include multiple processors 110. Processor 110 is coupled to 'n' peripherals 115(1)–(*n*). One skilled in the art will appreciate that these peripherals can include a broad range of peripheral equipment for example, storage devices (e.g., memory, disk drives, CD ROM or the like), printers, scanners, control equipment, customized systems and the like.

An extension slot controller 120 is coupled to processor 110. Extension slot controller 120 can be any standard bridging device or controller, for example, a PCI controller. System 100 further includes 'n' extension slots 140(1)–(*n*). The extension slots provide the ability to add additional peripherals for computer system 100 via add-in cards (e.g., network interface, game interface, printer card and the like). Extension slot controller communicates to extension slots 140 via a bus 130. Bus 130 can be any standard bus (e.g., PCI local bus or the like). One skilled in the art will appreciate that computer system 100 can include various other elements not shown here for example, memory, peripheral storage, various controllers (e.g., interrupt, input/output, or the like), bus interface controller (e.g., north bridge, south bridge or the like), communication interfaces and the like.

Add-in cards can have a variety of performance capabilities. For example, a PCI add-in card can support 33 megahertz (MHz), 66 MHz, 100 MHz, and/or 133 MHz. Additionally, a PCI add-in card can support PCI and/or PCI-X modes of operation. PCI-X mode is supported at 133, 100 and 66 MHz. PCI mode is supported at 66 and 33 MHz. Exemplary implementations include a system with one slot capable of operating up to 133 MHz, a system with two slots capable of operating up to 100 MHz, and a system with four slots capable of operating up to 66 MHz. The number of slots supported by a particular implementation of the extension slot controller is a function of many factors such as market requirements, bus loading limitations, pin count constraints, and the like. Because bus 130 is shared between extension slots 140, all cards must be operated at the same speed and mode to prevent communication faults.

Each extension slot can have, for example, an attention button, an attention indicator, a power indicator, and a MRL (mechanical or manually-operated retention latch). The attention button is an optional momentary-contact push button, located adjacent to each hot-plug slot, which is pressed by the user to initiate a hot-insertion or a hot-removal at the slot. The attention indicator shows the attention state of the slot and indicates that an operational problem exists or that the hot-plug slot is being identified so that a human operator can locate it easily. The attention indicator is off for normal operation, blinking for locate operations, and on to indicate that there is an operational problem with this slot. The power indicator shows the power state of the slot. The power indicator is off to indicate that all supply voltages have been removed from the slot and that insertion or removal of add-in cards is permitted. The power indicator is on to indicate that the slot is powered on and insertion or removal of add-in cards is not permitted. The power indicator is blinking to indicate a transition, that the slot is in the process of powering up or down and that insertion or removal of add-in cards is not permitted. The MRL is a manually operated retention mechanism that holds an add-in card in a slot and prevents the user from removing the card.

A hot-plug event can occur when extension slots are accessed (e.g., insertion/removal of add-in cards or the like). The hot-plug event can be initiated in various ways defined by the controller specification. For example when a manually-operated retention latch (MRL) that holds the add-in card in the extension slot to prevent a user from removing it from the slot is accessed by the user a MRL sensor associated with the MRL can trigger a hot-plug event request. Similarly, when an attention switch is configured with an extension slot, then using the attention switch can trigger a hot-plug event for the system. The hot-plug event can also be initiated through software. For example, application software can generate a hot-plug event request to access an extension slot for removal or insertion of the associated add-in cards.

Figure 1B:
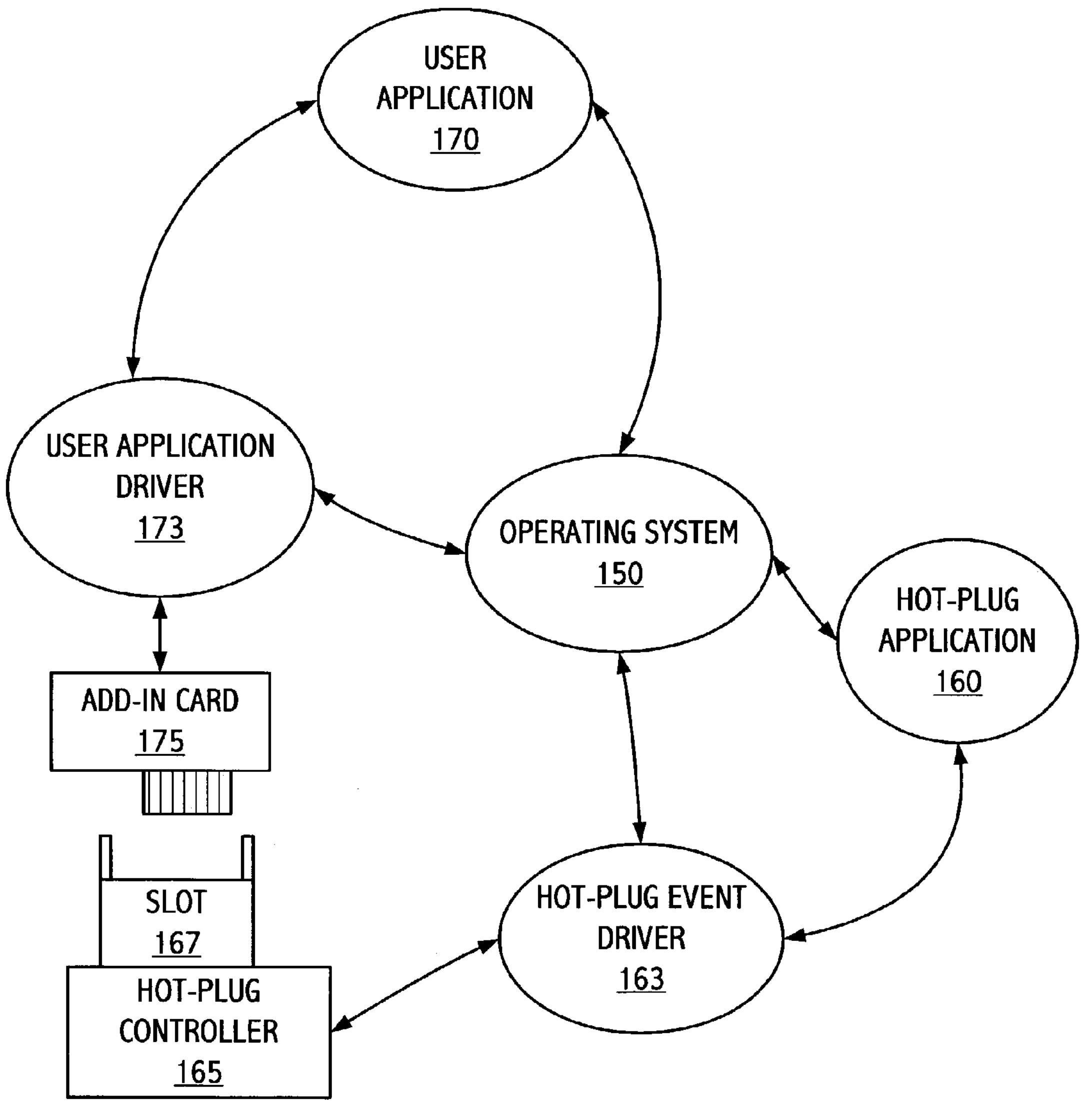

FIG. 1B illustrates an example of software module interaction with extension slot hardware for hot-plug events in computer system 100 according to an embodiment of the present invention. While for the purpose of illustration, exemplary communication links are shown between the processes, one skilled in the art will appreciate that these processes can alternatively independently communicate with any other process shown and each process can be executed independent of the other and can interact and communicate information with other processes.

Computer system 100 runs an operating system 150. Operating system 150, can be any operating system such as Windows, Linux, or the like. A hot-plug application 160 and a hot-plug event driver 163 which are executing on computer system 100 can interact with operating system 150. Hot-plug application 160 is optional and can be a combination of various software routines executing various different hot-plug event sequences. Hot-plug event driver 163 can be a platform specific driver to function with an extension slot controller such as hot-plug controller 165, for example, to power up or power down slot 167. For example, hot-plug application 160 or hot-plug event driver 163 can implement a hot-plug event sequence defined by the controller specification. Similarly, hot-plug application 160 or hot-plug event driver 163 can be configured as a peripheral routine of operating system 150. One skilled in art will appreciate that hot-plug event driver 163 can be implemented according to the functional requirements of the hardware platform (e.g., computer system 100 or the like) or the operating system (e.g., operating system 150 or the like) executing on the hardware platform.

A user application 170 and a user application driver 173 interact with operating system 150. User application 170 can be any application, for example, a network application. User application driver 173 can be a functional driver associated with a particular add-in card such as add-in card 175. Hot-plug application 160 and hot-plug event driver 163 are transparent to and do not communicate with user application 170 and user application driver 173. Hot-plug application 160 and hot-plug event driver 163 are only active upon a hot-plug event and do not interact with user application activities.

Figure 2A:
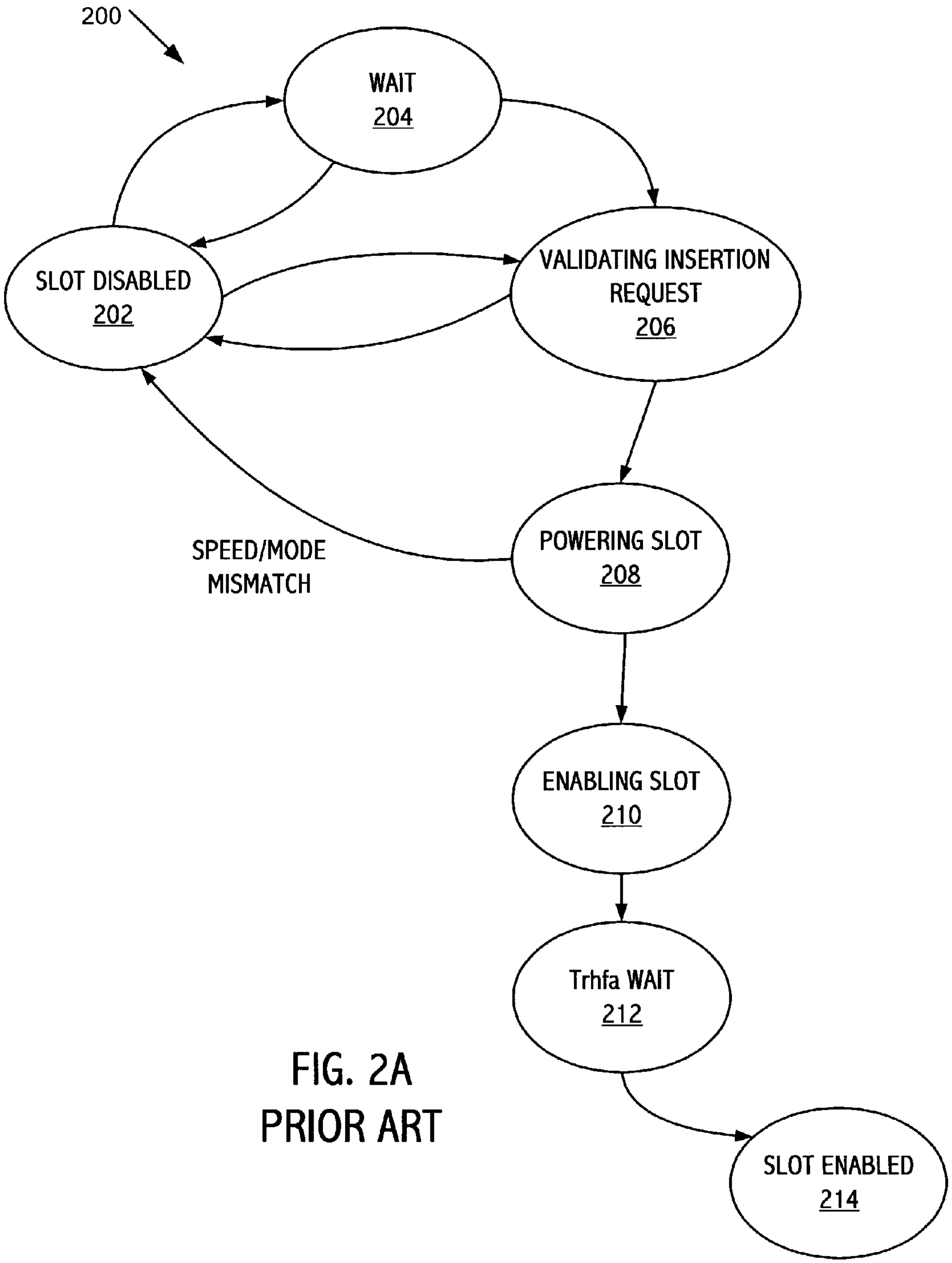
FIGS. 2A–2B, labeled prior art, illustrate flow diagrams of hot-plug events.

FIG. 2A, labeled prior art, illustrates flow diagram 200 of a hot-insertion event and enabling a slot. To enable a slot, the slot is powered up and connected to the bus. An add-in card in an enabled slot is ready to be addressed by software after a specified initialization period. In a slot disabled state 202, bus signals and clocks are disconnected from the slot and reset is asserted to the slot. Main supply voltages are not present at the slot. If the MRL is closed, MRL switched signals are connected to the slot. The power indicator state is off. A transition to wait state 204 occurs if the MRL is closed and the attention button is pressed. A transition to validating insertion request state 206 occurs if the MRL is closed and system software, for example, a software user interface or system management software, initiates powering or enabling the slot.

In wait state 204, system software waits five seconds to provide the user with an opportunity to cancel the hot-plug operation. Bus signals and clocks are disconnected from the slot and reset is asserted to the slot. Main supply voltages are not present at the slot. If the MRL is closed, MRL Switched Signals are connected to the slot. The power indicator state is blinking. A transition to slot disabled state 202 occurs if the attention button is pressed within five seconds. A transition to validating insertion request state 206 occurs if five seconds elapse with no request to abort the operation.

In validating insertion request state 206, system software verifies that the user's request to enable the slot should proceed. Bus signals and clocks are disconnected from the slot and reset is asserted to the slot. Main supply voltages are not present at the slot. If the MRL is closed, the MRL Switched Signals are connected to the slot. The power indicator state is blinking. A transition to slot disabled state 202 occurs if any reason for not allowing the operation to proceed is detected by system software. A transition to powering slot state 208 occurs if the MRL at this slot is closed and the request is valid.

In powering slot state 208, system software has issued the command to power the slot to determine the speed and mode capabilities of the add-in card. Bus signals and clocks are disconnected from the slot and reset is asserted to the slot. Main supply voltages and MRL switched signals are present at the slot. The power indicator state is blinking. A transition to enabling slot state 210 occurs if no bus speed, bus mode, or power problems are detected. A transition to slot disabled state 202 occurs if the add-in card is not compatible with the current speed or mode of the bus or if power problems are detected, or if a power fault occurs at this slot, or if the MRL at this slot opens.

In enabling slot state 210, system software has issued the command to enable the slot. The extension slot controller connects the clock and bus signals in a specific sequence and then reset is deasserted. Main supply voltages and MRL switched signals are present at the slot. The power indicator state is blinking. A transition to Trhfa wait state 212 occurs when clock and bus signals are connected to the slot and reset is deasserted (at the completion of the command execution). A transition to slot disabled state 202 (not shown) occurs if a power fault occurs at this slot, or if the MRL at this slot opens.

In Trhfa wait state 212, system software enforces the bus specification regarding the minimum time from reset high to first configuration access. Bus signals and clocks are connected to the slot and reset is deasserted. Main supply voltages and MRL switched signals are present at the slot. The power indicator state is blinking. A transition to slot enabled state 214 occurs after Trhfa time. A transition to slot disabled state 202 (not shown) occurs if a power fault occurs at this slot, or if the MRL at this slot opens.

In slot enabled state 214, the slot is ready for operation. Bus signals and clocks are connected to the slot and reset is deasserted. Main supply voltages and MRL switched signals are present at the slot. The power indicator state is on.

Figure 2B:
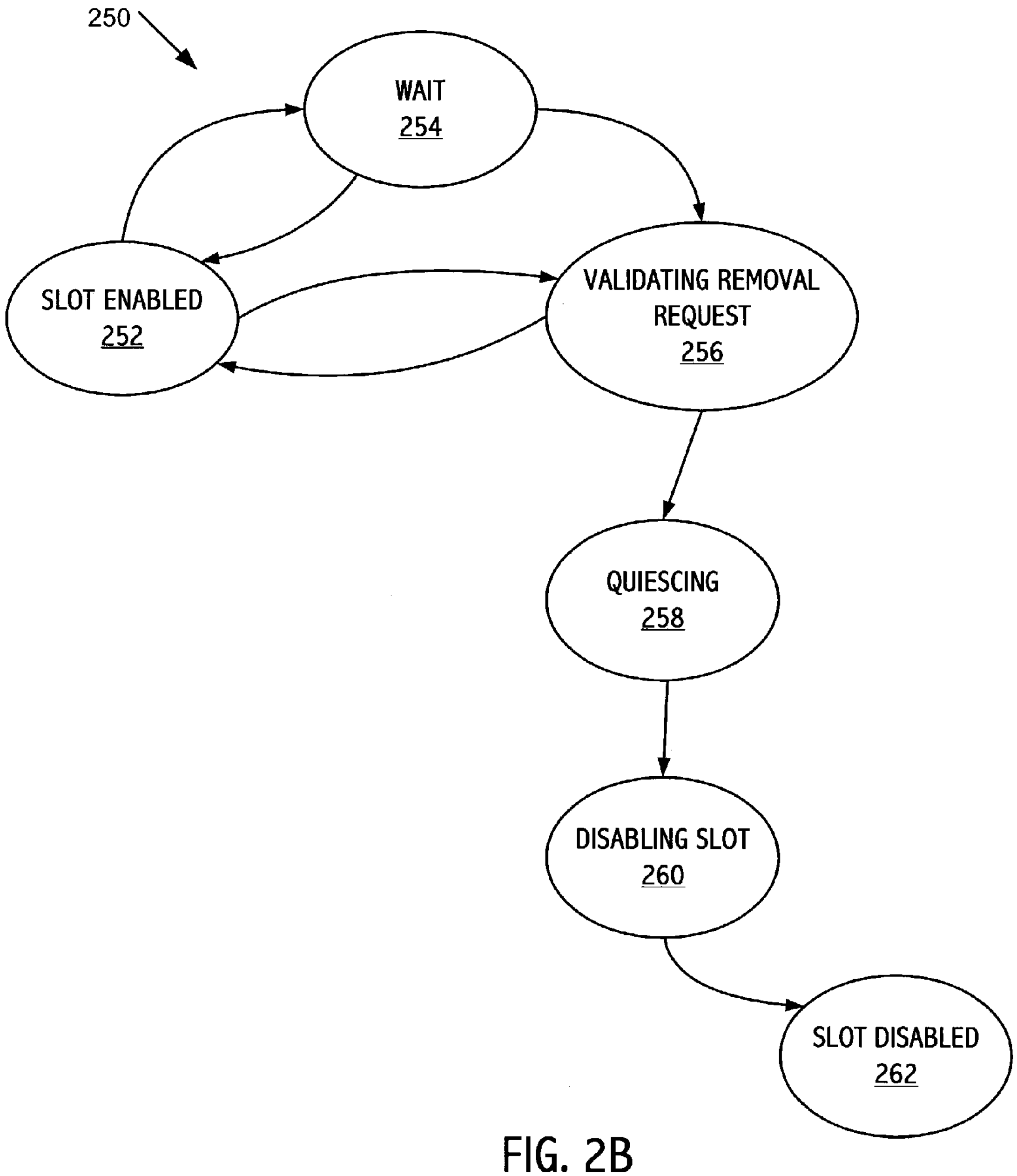

FIG. 2B, labeled prior art, illustrates flow diagram 250 of a hot-removal event and the disabling of the slot. To disable a slot, the slot is disconnected from the bus and powered down. A slot must be disabled before an add-in card is physically inserted or removed. In slot enabled state 252, the slot is ready for operation. Bus signals and clocks are connected to the slot and reset is de-asserted. Main supply voltages and MRL switched signals are present at the slot. The power indicator state is on. A transition to wait state 254 occurs if the attention button is pressed. A transition to validating removal request state 256 occurs if system software (for example, a software user interface or system management software) initiates disabling the slot. A transition to slot disabled state 262 (not shown) occurs if a power fault occurs at this slot, or if the MRL opens at this slot.

In wait state 254, system software waits five seconds to provide the user with an opportunity to cancel the hot-plug operation. Bus signals and clocks are connected to the slot and reset is deasserted. Main supply voltages and MRL switched signals are present at the slot. The power indicator state is blinking. A transition to validating removal request state 256 occurs if five seconds elapses with no request to abort the operation. A transition to slot enabled state 252 occurs if the Attention Button is pressed within five seconds. A transition to slot disabled state 262 (not shown) occurs if a power fault occurs at this slot, or if the MRL opens at this slot.

In validating removal request state 256, system software verifies that the user's request to disable the slot should proceed. Bus signals and clocks are connected to the slot and reset is deasserted. Main supply voltages and MRL switched signals are present at the slot. The power indicator state is blinking. A transition to slot enabled state 252 occurs if any reason for not allowing the operation to proceed is detected by system software. A transition to slot disabled state 262 (not shown) occurs if a power fault occurs at this slot, or if the MRL opens at this slot. A transition to quiescing state 258 occurs if no reasons for disallowing the operation are detected.

In quiescing state 258, system software quiesces the device. Bus signals and clocks are connected to the slot and reset is deasserted. Main supply voltages and MRL switched signals are present at the slot. The power indicator state is blinking. A transition to disabling slot state 260 occurs when the device is quiesced and ready for removal. A transition to slot disabled state 262 (not shown) occurs if a power fault occurs at this slot, or if the MRL opens at this slot.

In disabling slot state 260, system software has issued the 'disable slot' command and is waiting for the extension slot controller to assert reset, disconnect bus signals and clock lines, and remove power in a specific sequence. The power indicator state is blinking. A transition to slot disabled state 262 occurs when the add-in card is disabled (at the completion of command execution), or if a power fault occurs at this slot, or if the MRL opens at this slot.

In slot disabled state 262, bus signals and clocks are disconnected from the slot and reset is asserted to the slot. Main supply voltages are not present at the slot. If the MRL is closed, the MRL switched signals are applied to the slot. This is the same state as slot disabled state 202 in FIG. 2A. Refer to FIG. 2A for information on transitions from slot disabled state 202. The power indicator state is off.

Figure 3:
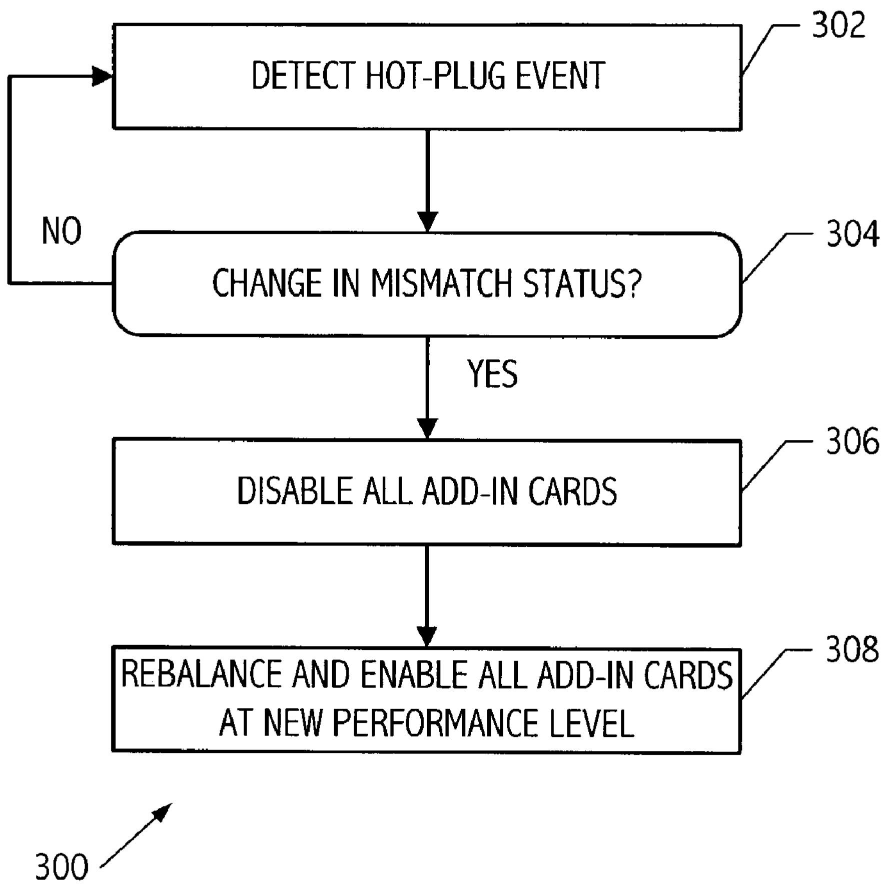
FIG. 3 illustrates a flow diagram of hot-plug events according to an embodiment of the present invention.

FIG. 3 illustrates a flow diagram 300 of hot-plug events according to an embodiment of the present invention. A hot-plug event is detected, step 302, for example, the insertion or removal of an add-in card. A determination is made whether a change in mismatch status has occurred, step 304. A change in mismatch status occurs when, for example, a newly inserted card cannot operate at the current performance level of the extension bus or when a newly removed card removes a mismatch. A newly removed card removes a mismatch status if the newly removed card caused all other add-in cards to be operated at a lower performance level than available. If a change in mismatch status has not occurred, the flow returns to step 302. If so, all add-in cards are disabled, step 306. Next, all add-in cards are rebalanced (highest common performance level of all add-in cards is determined) and enabled at the new performance level, step 308.

Figure 4A:
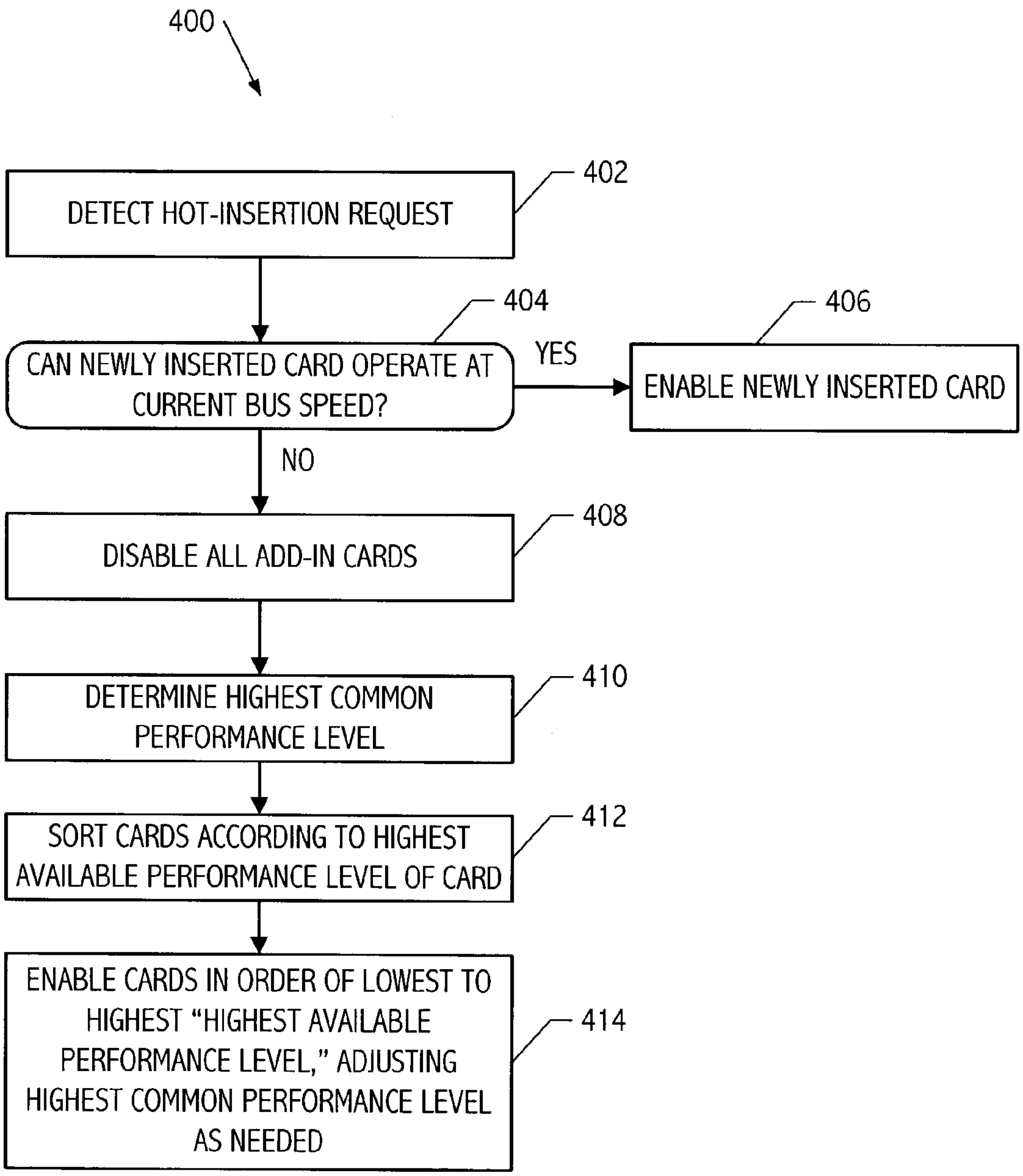
FIGS. 4A–4B illustrate additional flow diagrams of hot-plug events according to embodiments of the present invention.

FIG. 4A illustrates a detailed flow diagram 400 of hot-insertion events according to an embodiment of the present invention. A hot-insertion request is detected, step 402. A determination is made whether the newly inserted card can operate at the current extension bus performance level, step 404. If so, the newly inserted card is enabled, step 406, for example, according to flow 200 of FIG. 2A. If the newly inserted card cannot operate at the current extension bus performance level, all add-in cards are disabled, step 408. Add-in cards can be disabled according to flow 250 illustrated in FIG. 2B.

The highest comment performance level of all inserted add-in cards is determined, step 410. Next, all cards are sorted according to their highest available performance level, step 412. Cards are enabled in the order of lowest to highest of their highest available performance level, step 414. If the first card to be enabled cannot be enabled, for example, due to a power fault, the highest common performance level can be re-determined and the cards re-sorted such that the extension bus is always operating at a highest possible performance level.

Figure 4B:
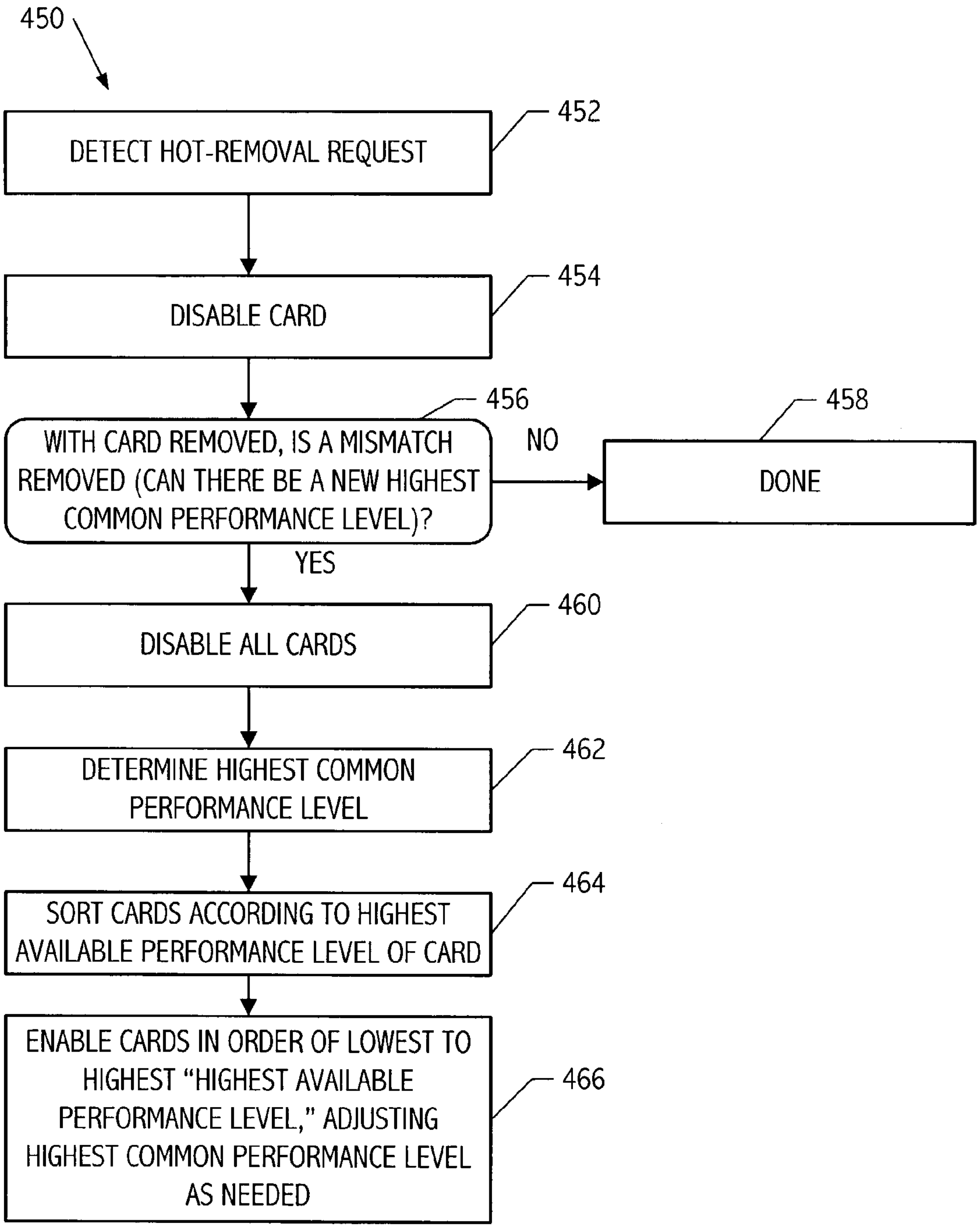

FIG. 4B illustrates a detailed flow diagram 450 of hot-removal events according to an embodiment of the present invention. A hot-removal request for an add-in card is detected, step 452. The add-in card is disabled, step 454, for example, according to flow 250 of FIG. 2B. A determination is made whether the removal of the add-in card has removed a mismatch condition, step 456. For example, if by removing the add-in card the remaining add-in cards have a new highest common performance level, a mismatch condition was removed. If a mismatch condition was not removed, no further action is needed, step 458. If so, all add-in cards are disabled, step 460. Add-in cards can be disabled according to flow 250 illustrated in FIG. 2B.

The highest comment performance level of all inserted add-in cards is determined, step 462. Next, all cards are sorted according to their highest available performance level, step 464. Cards are enabled in the order of lowest to highest of their highest available performance level, step 466. If the first card to be enabled cannot be enabled, for example, due to a power fault, the highest common performance level can be re-determined and the cards re-sorted such that the extension bus is always operating at a highest possible performance level.

Figure 5:
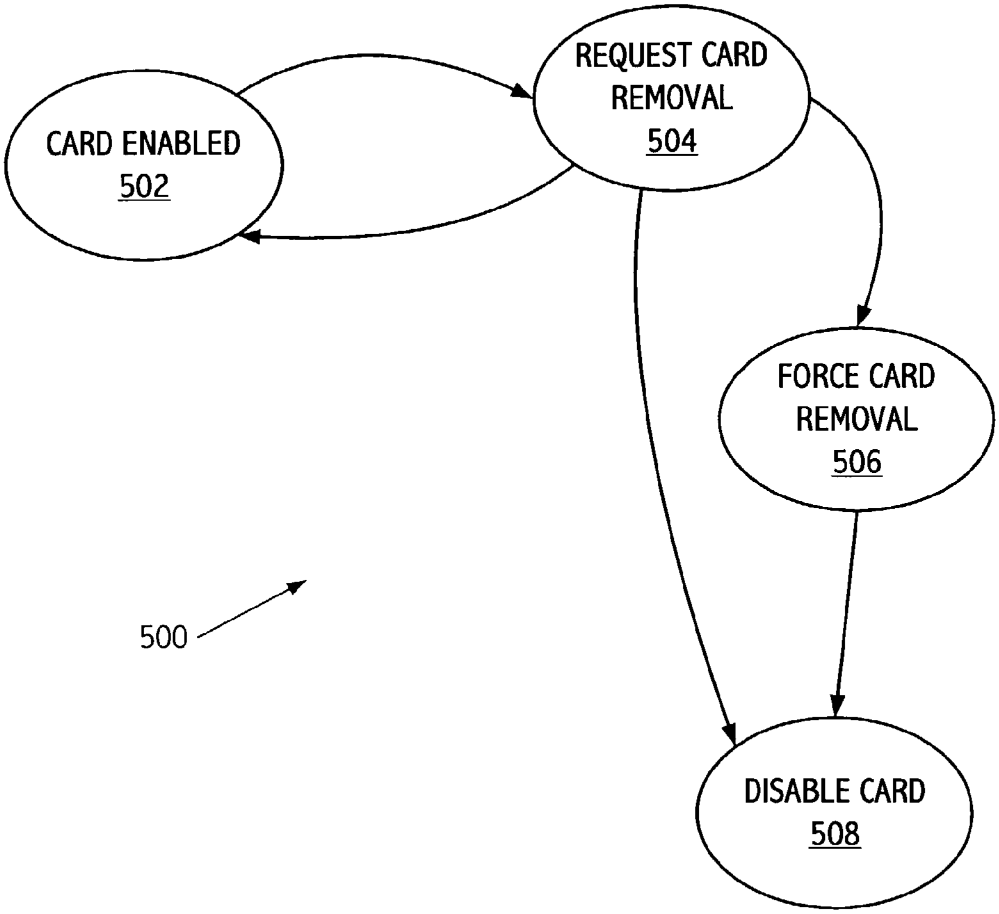
FIG. 5 illustrates a flow diagram 500 of disabling an add-in card according to an embodiment of the present invention.

FIG. 5 illustrates a flow diagram 500 for disabling an add-in card according to an embodiment of the present invention. Beginning with a card enabled state 502, a transition is made to a request card removal state 504 upon a hot-removal event. Three possible responses to a card removal request can be received, a cancel card removal response, an approve card removal response, or a request time out response. A transition is made back to card enabled state 502 if a cancel card removal response is received. A transition is made to a force card removal state 506 if a request time out response is received. A transition is made to a disable card state 508 if an approve card removal response is received. From the force card removal state 506 a transition is made to disable card state 508 after a specified period of time. Note that request card removal state 504 and force card removal state 506 can transition to disable card state 508 without the actual removal of the add-in card.

A variety of or combination of techniques can be utilized for the disabling of cards, for example, in step 306 of FIG. 3, step 408 in FIG. 4A, or step 460 in FIG. 4B, such as the flows illustrated in FIG. 2B or FIG. 5. In one embodiment, all cards are disabled utilizing a surprise or forceful removal, for example, where the only responses allowed are approve card removal or request time out. Thus, all cards are quickly disabled allowing for rebalancing and enabling of all cards.

In an alternate embodiment, politely requesting card removal such that allowed responses include cancel card removal, approve card removal, or request time out can result in several cards disabled while another is busy and thus still enabled. Rebalancing cannot occur until all cards are disabled. Thus, the processing can re-enable all cards and either cancel the rebalancing or attempt the rebalancing at a later time, or wait until all cards are not busy and are disabled.

In one embodiment, a query to a user can be performed prior to rebalancing the add-in cards. For example, a user may not be aware that a newly inserted add-in card performs at a significantly lower performance level than the current performance level. Thus, the user can decide whether to rebalance the bus or keep the newly inserted add-in card disabled. Additionally, the user can be queried whether to perform rebalancing if, for example, the rebalancing would interrupt a currently busy card.

The technique described above may be embodied in a computer-readable medium for configuring a computer system to execute the method. The computer readable media may be permanently, removably or remotely coupled to system 100 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

The operations referred to herein may be modules or portions of modules (e.g., software, firmware, or hardware modules). For example, the software modules discussed herein may include script, batch or other executable files, or combinations and/or portions of such files. The software modules may include a computer program or subroutines thereof encoded on computer-readable media.

A program is a list of instructions such as a particular application program and/or an operating system. A computer program is typically stored internally on computer readable storage media or transmitted to the computer system via a computer readable transmission medium. A computer process typically includes an executing (running) program or portion of a program, current program values and state information, and the resources used by the operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of operating a system having multiple extension slots comprising:

detecting a change in status of a mismatch condition upon a hot-plug event; and rebalancing a current performance level of one or more add-in cards in response thereto.

2. The method as recited in claim 1, wherein the hot-plug event is an insertion of an add-in card and the change in status of the mismatch condition occurs because the add-in card cannot perform at the current performance level.

3. The method as recited in claim 1, wherein the hot-plug event is a removal of an add-in card and the change in status occurs because the removal of the add-in card increases a highest common performance level of the one or more add-in cards.

4. The method as recited in claim 1, wherein the rebalancing comprises:

disabling the one or more add-in cards;

enabling the one or more add-in cards at a different performance level.

5. The method as recited in claim 4, wherein the rebalancing further comprises:

determining the different performance level to be a highest common performance level of all inserted add-in cards.

6. The method as recited in claim 4, wherein the disabling comprises:

requesting removal of one of the one or more add-in cards and receiving one of two responses: an approve card removal response or a request time out response;

disabling the one of the one or more add-in cards upon receipt of the approve card removal response or the request time out response; and repeating the requesting and the disabling for each of the one or more add-in cards.

7. The method as recited in claim 4, wherein the disabling comprises:

requesting removal of one of the one or more add-in cards and receiving one of three responses: a cancel card removal response, an approve card removal response, or a request time out response;

forcing removal of the one of the one or more add-in cards if the request timeout response is received;

disabling the one of the one or more add-in cards if the approve card removal response is received or after the forcing removal is performed;

repeating the requesting removal, the forcing removal and the disabling the one of the one or more add-in cards for each of the one or more add-in cards; and canceling the disabling the one or more add-in cards if the cancel card removal response is received.

8. The method as recited in claim 4, wherein the enabling comprises:

sorting the one or more add-in cards according to a highest available performance level of each of the one or more add-in cards; and enabling the one or more add-in cards at the different performance level in the order of the lowest to highest of the highest available performance level of each of the one or more add-in cards.

9. The method as recited in claim 8, further comprising:

performing another rebalancing if a first card to be enabled cannot be enabled.

10. The method as recited in claim 8, further comprising:

performing another rebalancing if one of the one or more add-in cards cannot be enabled and a highest common performance level of the other one or more add-in cards is different than the different performance level.

11. The method as recited in claim 4, wherein the different performance level is a highest common performance level of all inserted add-in cards.

12. The method as recited in claim 1, wherein the rebalancing is performed after querying a user and receiving an approval.

13. The method as recited in claim 1, wherein the one or more add-in cards are PCI expansion cards.

14. The method as recited in claim 1, wherein the current performance level is a combination of speed and mode.

15. A computer program product for configuring a system comprising:

a set of instructions stored on computer readable media, the set of instructions configured to:

detect a change in status of a mismatch condition upon a hot-plug event; and rebalance a current performance level of one or more add-in cards in response thereto.

16. The computer program product as recited in claim 15, wherein the hot-plug event is an insertion of an add-in card and the change in status of the mismatch condition occurs because the add-in card cannot perform at the current performance level.

17. The computer program product as recited in claim 15, wherein the hot-plug event is a removal of an add-in card and the change in status occurs because the removal of the add-in card increases a highest common performance level of the one or more add-in cards.

18. The computer program product as recited in claim 15, wherein to rebalance the current performance level, the set of instructions is configured to:

disable the one or more add-in cards;

enable the one or more add-in cards at a different performance level.

19. The computer program product as recited in claim 18, wherein to rebalance the current performance level, the set of instructions is further configured to:

determine the different performance level to be a highest common performance level of all inserted add-in cards.

20. The computer program product as recited in claim 18, wherein to disable the one or more add-in cards, the set of instructions is configured to:

request removal of one of the one or more add-in cards and receiving one of two responses: an approve card removal response or a request time out response;

disable the one of the one or more add-in cards upon receipt of the approve card removal response or the request time out response; and repeat the request removal and the disable for each of the one or more add-in cards.

21. The computer program product as recited in claim 18, wherein to disable the one or more add-in cards, the set of instructions is configured to:

request removal of one of the one or more add-in cards and receiving one of three responses: a cancel card removal response, an approve card removal response, or a request time out response;

force removal of the one of the one or more add-in cards if the request timeout response is received;

disable the one of the one or more add-in cards if the approve card removal response is received or after the forcing removal is performed;

repeat the request removal, the force removal and the disable the one of the one or more add-in cards for each of the one or more add-in cards; and cancel the disable the one or more add-in cards if the cancel card removal response is received.

22. The computer program product as recited in claim 18, wherein to enable the one or more add-in cards, the set of instructions is configured to:

sort the one or more add-in cards according to a highest available performance level of each of the one or more add-in cards; and enable the one or more add-in cards at the different performance level in the order of the lowest to highest of the highest available performance level of each of the one or more add-in cards.

23. The computer program product as recited in claim 22, the set of instructions further configured to:

perform another rebalance if a first card to be enabled cannot be enabled.

24. The computer program product as recited in claim 22, the set of instructions further configured to:

perform another rebalance if one of the one or more add-in cards cannot be enabled and a highest common performance level of the other one or more add-in cards is different than the different performance level.

25. The computer program product as recited in claim 18, wherein the different performance level is a highest common performance level of all inserted add-in cards.

26. An apparatus comprising:

means for detecting a change in status of a mismatch condition upon a hot-plug event; and means for rebalancing a current performance level of one or more add-in cards in response thereto.

27. The apparatus as recited in claim 26, wherein the hot-plug event is an insertion of an add-in card and the change in status of the mismatch condition occurs because the add-in card cannot perform at the current performance level.

28. The apparatus as recited in claim 26, wherein the hot-plug event is a removal of an add-in card and the change in status occurs because the removal of the add-in card increases a highest common performance level of the one or more add-in cards.

29. The apparatus as recited in claim 26, wherein the means for rebalancing comprises:

means for disabling the one or more add-in cards;

means for enabling the one or more add-in cards at a different performance level.

30. The apparatus as recited in claim 29, wherein the means for rebalancing further comprises:

means for determining the different performance level to be a highest common performance level of all inserted add-in cards.

31. The apparatus as recited in claim 29, wherein the means for disabling comprises:

means for requesting removal of one of the one or more add-in cards and means for receiving one of two responses: an approve card removal response or a request time out response;

means for disabling the one of the one or more add-in cards upon receipt of the approve card removal response or the request time out response; and means for repeating the means for requesting and the means for disabling for each of the one or more add-in cards.

32. The apparatus as recited in claim 29, wherein the means for disabling comprises:

means for requesting removal of one of the one or more add-in cards and means for receiving one of three responses: a cancel card removal response, an approve card removal response, or a request time out response;

means for forcing removal of the one of the one or more add-in cards if the request timeout response is received;

means for disabling the one of the one or more add-in cards if the approve card removal response is received or after the means for forcing removal is performed;

means for repeating the requesting removal, the forcing removal and the disabling the one of the one or more add-in cards for each of the one or more add-in cards; and means for canceling the means for disabling the one or more add-in cards if the cancel card removal response is received.

33. The apparatus as recited in claim 29, wherein the means for enabling comprises:

means for sorting the one or more add-in cards according to a highest available performance level of each of the one or more add-in cards; and means for enabling the one or more add-in cards at the different performance level in the order of the lowest to highest of the highest available performance level of each of the one or more add-in cards.

34. The apparatus as recited in claim 33, further comprising:

means for performing another rebalancing if a first card to be enabled cannot be enabled.

35. The apparatus as recited in claim 33, further comprising:

means for performing another rebalancing if one of the one or more add-in cards cannot be enabled and a highest common performance level of the other one or more add-in cards is different than the different performance level.

36. The apparatus as recited in claim 29, wherein the different performance level is a highest common performance level of all inserted add-in cards.

37. A computer system comprising:

an extension slot controller coupled to a plurality of extension slots; and a hot-plug event driver;

wherein the extension slot controller is configured by the hot-plug event driver to enable and disable at a current performance level one or more add-in cards inserted into the plurality of extension slots;

wherein the hot-plug event driver is configured to, upon a hot-plug event and a change in a mismatch condition, rebalance the current performance level of the one more add-in cards.

38. The computer system as recited in claim 37, wherein the hot-plug event is an insertion of an add-in card and the change in status of the mismatch condition occurs because the add-in card cannot perform at the current performance level.

39. The computer system as recited in claim 37, wherein the hot-plug event is a removal of an add-in card and the change in status occurs because the removal of the add-in card increases a highest common performance level of the one or more add-in cards.

40. The computer system as recited in claim 37, wherein to rebalance, the hot-plug event driver is configured to:

disable the one or more add-in cards;

enable the one or more add-in cards at a different performance level.

41. The computer system as recited in claim 40, wherein to rebalance, the hot-plug event drive is further configured to:

determine the different performance level to be a highest common performance level of all inserted add-in cards.

42. The computer system as recited in claim 40, wherein to disable the one or more add-in cards, the hot-plug event driver is configured to:

request removal of one of the one or more add-in cards and receive one of two responses: an approve card removal response or a request time out response;

disable the one of the one or more add-in cards upon receipt of the approve card removal response or the request time out response; and repeat the request removal and the disable the one of the one or more add-in cards for each of the one or more add-in cards.

43. The computer system as recited in claim 40, wherein to enable the one or more add-in cards, the hot-plug event driver is configured to:

sort the one or more add-in cards according to a highest available performance level of each of the one or more add-in cards; and enable the one or more add-in cards at the different performance level in the order of the lowest to highest of the highest available performance level of each of the one or more add-in cards.

44. The computer system as recited in claim 43, wherein to enable the one or more add-in cards, the hot-plug event driver is further configured to:

perform another rebalancing if one of the one or more add-in cards cannot be enabled and a highest common performance level of the other one or more add-in cards is different than the different performance level.

45. The computer system as recited in claim 40, wherein the different performance level is a highest common performance level of all inserted add-in cards.

* * * * *